United States Patent Office 3,213,069
Patented Oct. 19, 1965

3,213,069
PROCESS FOR THE PRODUCTION OF ACRYLONITRILE POLYMERS USING A CATALYST SYSTEM OF NITRIC ACID AND SULFUR DIOXIDE
Werner Rausch, Dormagen, Germany, assignor to Farbenfabriken Bayer Aktiengesellschaft, Leverkusen, Germany, a corporation of Germany
No Drawing. Filed May 9, 1962, Ser. No. 193,618
Claims priority, application Germany, June 9, 1961,
F 34,128
4 Claims. (Cl. 260—79.7)

The present invention relates to a new process for the production of acrylonitrile polymers with particularly good properties, using special polymerisation catalysts.

It is known to polymerise acrylonitrile in an aqueous medium at pH-values below 7, either by itself or in admixture with other vinyl compounds, with the aid of redox systems based on per-compounds and sulphur compounds of low oxidation stages. The polymers obtained in this way serve for the production of shaped articles, such as filaments, foils, fibres and the like.

It has also become known that acrylonitrile can be polymerised using salt-free catalyst systems, for example the catalyst system comprising hydrogen peroxide and glycol sulphite (see German patent specification 1,063,- 809 and the patent specification No. 18,026 of the German Democratic Republic). Disadvantages of this process are the poor dyeing capacity and the low thermal stability of the filaments manufactured from these polymers.

It is an object of the present invention to provide acrylonitrile polymers which have a particularly light initial tone and a high thermal stability. Another object consists in providing a process for the production of these acrylonitrile polymers. Yet another object of the invention consists in making available such acrylonitrile polymers, from which spinning solutions which can be satisfactorily filtered and spun can be prepared. Other objects will be apparent from the following description and the examples.

It has now been found that acrylonitrile polymers with good dyeing capacity and a particularly light initial tone can be obtained by polymerisation of acrylonitrile by itself or together with other polymerisable vinyl compounds in aqueous medium at pH-values below 7 (if desired in the presence of heavy metal ions) and using a salt-free catalyst system only if nitric acid and sulphur dioxide are used as the salt-free catalyst system.

With the catalyst system as described, it is surprising that pure white polymers and filaments are obtained, although products which are yellow in colour would have been expected when using nitric acid. In addition, it is remarkable that no per-compounds are required as catalyst.

The process of the invention is suitable both for polymerising acrylonitrile by itself and for co-polymerising acrylonitrile with other vinyl compounds. As vinyl compounds, there are to be considered all those compounds which can be copolymerised with acrylonitrile in the usual manner for the production of polymers which are particularly suitable for the manufacture of fibres. The following are to be specifically mentioned: acrylic and methacrylic acid esters, styrene, vinyl chloride, vinylidene chloride and vinyl acetate. It is also possible to use vinyl compounds containing reactive groups, and these include unsaturated amines and amides as well as unsaturated sulphonic acids, such as styrene-sulphonic acids.

Especially suitable for copolymerisation are unsaturated disulphonimides, such as those described in detail in German patent specification No. 1,089,658.

The polymerisation according to the invention is itself carried out in the usual manner, water serving as polymerisation medium. Advantageously 500 to 2000 parts by weight of water are used to 100 parts by weight of monomer. Heavy metal ions, advantageously sulphates or other soluble salts of divalent copper and iron are used as auxiliary substances, in quantities of 0.0001 to 0.1%, based on the monomer. The catalyst system used according to the invention is salt free and comprises nitric acid and sulphur dioxide. The molar ratio between nitric acid and sulphur dioxide is 3:1 to 1:15, advantageously 2:1 to 1:10. The quantity by weight of nitric acid and sulphur dioxide is 1–15% advantageously 2–10%, calculated on the monomer. The sulphur dioxide can be added in the form of sulphur dioxide-water with a pre-determined $SO_2$-content or the sulphur dioxide is introduced into the polymerisation mixture. The reaction temperatures are between 20 and 80° C., advantageously between 40 and 60° C. It has proved to be particularly advantageous to start the polymerisation with some of the reactants and auxiliary substances and then continuously to add the individual constituents of the mixture. The pH-value, which is below 7, and advantageously between 0.5 and 3, is adjusted by the sulphur dioxide and by the nitric acid which is used. However, other mineral salts, such as sulphuric acid, can also be used.

The polymers obtained by the process according to the invention are distinguished by a light initial tone and a low tendency to discoloration on being heated in the presence of air. The spinning solutions prepared from these polymers have a very good capacity for being filtered and spun. The filaments which are obtained have a very light initial tone and a good dyeing capacity.

The polymerisation velocity is fully adequate for industrial purposes. Conversions of more than 85% can be produced. Similarly, the molecular weight can be adjusted to any desired value by varying the quantity of catalyst without the conversions and the properties of the polymers being deleteriously affected.

The invention is further disclosed in the following examples, which are illustrative but not limitative thereof.

EXAMPLE 1

A polymerisation batch comprising 70 parts by weight of acrylonitrile is mixed with 1000 parts by weight of water and 10.5 parts by weight of concentrated nitric acid. The polymerisation is carried out at 40° C. while stirring, the polymerisation period being 15 hours. Sulphur dioxide is introduced during the first 6 hours. The pH-value is 1. Yield 98%. K-value 54.0 (K-value according to Fikentscher, Cellulosechemie 13, page 58 (1932)).

EXAMPLE 2

A polymerisation batch comprising 70 parts by weight of acrylonitrile is mixed with 750 parts by weight of water, 7 parts by weight of concentrated nitric acid, 200 parts by weight of sulphur dioxide-water (50 g. $SO_2/1$) and 0.0015 part by weight of iron sulphate ($FeSO_4.7H_2O$). The polymerisation is carried out at 40° C. while stirring, the polymerisation period being 6 hours. The pH-value is 1, the yield is 52% and the K-value is 75.8.

EXAMPLE 3

A polymerisation batch comprising 70 parts by weight of acrylonitrile is mixed with 750 parts by weight of water, 7 parts by weight of concentrated nitric acid, 200 parts by weight of sulphur dioxide-water (50 g. $SO_2/1$) and 0.025 part by weight of iron-ammonuim sulphate $(NH_4)_2Fe(SO_4)_2.6H_2O$. The polymerisation is carried out at 40° C. while stirring, the polymerisation period being 6 hours. The pH-value is 1. The yield 67% and the K-value is 74.1.

EXAMPLE 4

A polymerisation batch comprising 70 parts by weight of acrylonitrile is mixed with 750 parts by weight of water, 3.5 parts by weight of concentrated nitric acid, 200 parts by weight of sulphur dioxide-water (50 g. $SO_2/1$) and 0.03 part by weight of iron sulphate ($FeSO_4.7H_2O$). The polymerisation is carried out at 40° C. while stirring, the polymerisation period being 6 hours. The pH-value is 1, the yield is 83.0% and the K-value is 66.0.

EXAMPLE 5

A polymerisation batch consisting of 475 parts by weight of acrylonitrile and 25 parts by weight of methyl acrylate is mixed with 6500 parts by weight of water, 23 parts by weight of concentrated nitric acid, 560 parts by weight of sulphur dioxide-water (50 g. $SO_2/1$) and 0.28 part by weight of iron ammonium sulphate $$(NH_4)_2Fe(SO_4)_2.6H_2O$$

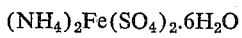

The polymerisation is carried out at 56° C. while stirring for a period of 6 hours. The pH-value is 1, the yield is 65% and the K-value is 84.0.

EXAMPLE 6

A polymerisation batch consisting of 485 parts by weight of acrylonitrile and 15 parts by weight of methacroyl-aminobenzene - benzene - disulphonimide (see German Patent No. 1,089,548) is mixed with 6500 parts by weight of water, 25 parts by weight of concentrated nitric acid, 550 parts by weight of sulphur dioxide-water (50 g. $SO_2/1$) and 0.0035 part by weight of iron ammonium sulphate $(NH_4)_2Fe(SO_4)_2.6H_2O$. The polymerisation is carried out at 50° C. while stirring and over a period of 6 hours. The pH-value is 1, the yield is 71% and the K-value is 83.2.

EXAMPLE 7

A polymerisation batch consisting of 475 parts by weight of acrylonitrile and 25 parts by weight of methyl acrylate is mixed with 6500 parts by weight of water, 46 parts by weight of concentrated nitric acid, 1100 parts by weight of sulphur dioxide-water (50 g. $SO_2/1$) and 0.5 part by weight of iron ammonium sulphate $$(NH_4)_2Fe(SO_4)_2.6H_2O$$

The polymerisation is carried out at 56° C. while stirring and for a period of 6 hours. The pH-value is 1, the yield is 79% and the K-value is 66.4.

EXAMPLE 8

A polymerisation batch comprising 70 parts by weight of acrylonitrile is mixed with 750 parts by weight of water, 7 parts by weight of concentrated nitric acid, 210 parts by weight of sulphur dioxide-water (50 g. $SO_2/1$) and 0.035 part by weight of a metal salt.

The polymerisation is carried out at 50° C. while stirring, the polymerisation period being 6 hours. The various metal salts, the yields and K-values are set-out in the following table:

| Metal Salt | Yield, percent | K-value |
|---|---|---|
| $FeSO_4.7H_2O$ | 78.4 | 58.1 |
| $(NH_4)_2Fe(SO_4)_2.6H_2O$ | 71.7 | 58.7 |
| $CuSO_4.5H_2O$ | 70.2 | 64.0 |
|  | 35.3 | 52.0 |

EXAMPLE 9

A polymerisation batch consisting of 66.5 parts by weight of acrylonitrile and 3.5 parts by weight of dichlorethene is mixed with 930 parts by weight of water, 7 parts by weight of concentrated nitric acid, 70 parts by weight of sulphur dioxide-water (50 g. $SO_2/1$) and 0.035 part by weight of iron ammonium sulphate $$(NH_4)_2Fe(SO_4)_2.6H_2O$$

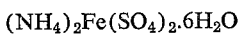

The polymerisation is carried out at 50° C. over a period of 6 hours while stirring. The pH-value is 1, yield is 45.8% and the K-value is 87.4.

EXAMPLE 10

A polymerisation batch consisting of 63 parts by weight of acrylonitrile and 7 parts by weight of dichlorethene is mixed with 930 parts by weight of water, 7 parts by weight of concentrated nitric acid, 70 parts by weight of sulphur dioxide-water (50 g. $SO_2/1$) and 0.035 part by weight of iron ammonium sulphate $$(NH_4)_2Fe(SO_4)_2.6H_2O$$

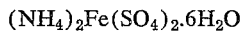

The polymerisation is carried out at 50° C. while stirring and over a period of 6 hours. The pH-value is 1, the yield is 44.3% and the K-value is 88.8.

Determination of the colour factor

The colour factor is a standard for the degree of whiteness of a polymer. It is measured as follows: 3 g. of polymer are dissolved in 27 g. of dimethyl formamide at 80° C. while stirring, then oxygen is introduced for 5 minutes and thereafter the solution is stirred again at 80° C. (Total stirring time at 80° C. is 3 hours.) The specimen is then cooled for 1 hour and measured against water in a photometer (Zeiss Elko III) with a S 45 E filter. The following table contains the colour factors of polyacrylonitriles which were prepared according to German patent specification No. 1,063,809 with the aid of hydrogen, peroxide and glycol sulphite (A) and according to Examples 1, 3 and 4 of the present patent application (B).

Colour factor per 1 cm. dish length:
- A 1  0.354
-   2  0.394
- B 1  0.225
-   2  0.172
-   3  0.283

The polymers mentioned in the table were dry spun from solutions in dimethyl formamide and the initial tone of the fibres were compared with one another. The differences in the initial tone of the fibres run parallel with the measured colour factors. If the fibres are dyed, the fibres according to the invention show a remarkably increased dye ability. The ratio between the colour factor of these fibres and the colour factor of the known fibres is for example 0.915 to 0.315.

I claim:

1. In the process for the production of acrylonitrile polymers by steps comprising polymerizing acrylonitrile in aqueous medium at pH values below 7, the improvement which comprises polymerizing the acrylonitrile in the presence of nitric acid and sulfur dioxide as catalyst.

2. A process for the production of acrylonitrile polymers which comprises polymerizing monomeric material in an aqueous medium having a pH value below 7 and having a content of said material not greater than 8.5%, said monomeric material being selected from the group consisting of (1) acrylonitrile and (2) mixtures containing more than 95% by weight of acrylonitrile, the balance being at least one other different copolymerizable ethylenically unsaturated compound, said polymerizing being effected at a temperature of about +20° to about +80° C. in the presence of a redox-catalyst system comprising nitric acid and sulfur dioxide, the amount of the nitric acid being within the range of 1 to 15% by weight of said monomeric material, the weight ratio of nitric acid to sulfur dioxide being in the range of 1:0.5 to 1:5 and recovering the acrylonitrile polymer from the polymerization medium.

3. A process for the production of acrylonitrile polymers which comprises polymerizing monomeric material in an aqueous medium having a pH value of from 0.5 to 3 and having a content of said material not greater than 8.5%, said monomeric material being selected from the group consisting of (1) acrylonitrile and (2) mixtures containing more than 95% by weight of acrylonitrile, the balance being at least one other different copolymerizable ethylenically unsaturated compound, said polymerizable being effected at a temperature of about +20° to about +80° C. in the presence of a redox-catalyst system comprising nitric acid and sulfur dioxide, the amount of the nitric acid being within the range of 1 to 15% by weight of said monomeric material, the weight ratio of nitric acid to sulfur dioxide being in the range of 1:0.5 to 1:5 and in the presence of a heavy metal ion selected from the group consisting of an iron and a copper ion, the amount of said heavy metal ion being in the range of 0.0001 to 0.1% by weight of said monomeric material and recovering the acrylonitrile polymer from the polymerization medium.

4. A process according to claim 3 wherein said copolymerizable ethylenically unsaturated compound is methacroyl-aminobenzene-benzene-disulfonimide.

References Cited by the Examiner

UNITED STATES PATENTS

| | | | |
|---|---|---|---|
| 2,356,925 | 8/44 | Fryling | 260—85.5 |
| 2,936,211 | 5/60 | Kocay et al. | 260—88.7 |
| 3,052,656 | 9/62 | Groene et al. | 260—85.5 |

OTHER REFERENCES

De Nie: Chem. Abs., vol. 42, p. 7574d ((1948).
Fujisaki et al.: Chem. Abs., 53 (1959), p. 20823i.

JOSEPH L. SCHOFER, *Primary Examiner.*

JOSEPH R. LIBERMAN, LEON J. BERCOVITZ,
*Examiners.*